United States Patent
Chen

(10) Patent No.: US 11,094,041 B2
(45) Date of Patent: Aug. 17, 2021

(54) GENERATION OF BOKEH IMAGES USING ADAPTIVE FOCUS RANGE AND LAYERED SCATTERING

(71) Applicant: Samsung Electronics Co., Ltd., Suwon-si (KR)

(72) Inventor: George Q. Chen, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/699,371

(22) Filed: Nov. 29, 2019

(65) Prior Publication Data

US 2021/0166353 A1   Jun. 3, 2021

(51) Int. Cl.
| | |
|---|---|
| *G06T 5/00* | (2006.01) |
| *H04N 5/232* | (2006.01) |
| *G06T 7/50* | (2017.01) |
| *G06T 5/50* | (2006.01) |

(52) U.S. Cl.
CPC ............... *G06T 5/002* (2013.01); *G06T 5/50* (2013.01); *G06T 7/50* (2017.01); *H04N 5/232935* (2018.08); *G06T 2200/24* (2013.01); *G06T 2207/20221* (2013.01)

(58) Field of Classification Search
CPC .. G06T 5/002; G06T 5/50; G06T 7/50; G06T 2200/24; G06T 2207/20221; H04N 5/232935
See application file for complete search history.

(56) References Cited

U.S. PATENT DOCUMENTS

| | | | |
|---|---|---|---|
| 9,418,400 B2 | 8/2016 | Sakharnykh et al. | |
| 2014/0267243 A1* | 9/2014 | Venkataraman | H04N 13/106 345/419 |
| 2014/0307954 A1 | 10/2014 | Doba et al. | |
| 2016/0247285 A1 | 8/2016 | Wu et al. | |
| 2018/0041709 A1* | 2/2018 | Konttori | H04N 5/232125 |
| 2018/0095342 A1 | 4/2018 | Mogami | |
| 2019/0304112 A1 | 10/2019 | Hota et al. | |

FOREIGN PATENT DOCUMENTS

EP   2934000 B1   11/2017

OTHER PUBLICATIONS

PhotoPills, "Depth of Field (DOF) Table", https://www.photopills.com/calculators/dof-table/, Sep. 30, 2017, 12 pages.

(Continued)

*Primary Examiner* — Ahmed A Berhan

(57) ABSTRACT

A method includes determining, using at least one processor, a depth of range of focus for a scene. The method also includes determining, using the at least one processor, multiple layers associated with the scene based on the depth of focus range, where each layer is associated with image data having a different range of disparity values. The method further includes blending, using the at least one processor, the layers to produce an image having a Bokeh effect in a foreground and a background, and focused image data within the depth of focus range. The multiple layers include at least a first layer associated with the foreground, a second layer associated with the depth of focus range, and a third layer associated with the background.

24 Claims, 11 Drawing Sheets

(56) References Cited

OTHER PUBLICATIONS

Le et al., "Apparatus and Method for Generating Low-Light Images With Improved Bokeh Using Mobile Electronic Device", U.S. Appl. No. 16/278,581, filed Feb. 18, 2019, 52 pages.
Wikipedia, "Bokeh", https://en.wikipedia.org/wiki/Bokeh, Oct. 26, 2019, 9 pages.
Wikipedia, "Circle of confusion", https://en.wikipedia.org/wiki/Circle_of_confusion, Nov. 6, 2019, 11 pages.
Xu et al., "Depth of Field Rendering via Adaptive Recursive Filtering", SIGGRAPH Asia 2014 Technical Briefs, Article No. 16 (SA '14), Dec. 2014, 4 pages.
Levoy, "Portrait mode on the Pixel 2 and Pixel 2 XL smartphones", Google AI Blog, Oct. 2017, 16 pages.
Siddiqui et al., "FPGA-Based Processor Acceleration for Image Processing Applications", Journal of Imaging, vol. 5, No. 1, Jan. 2019, 22 pages.
Wadhwa et al., "Synthetic Depth-of-Field with a Single-Camera Mobile Phone", ACM Transactions on Graphics (TOG), vol. 37, No. 4, Article No. 64, Aug. 2018, 18 pages.
He et al., "Efficient Gather and Scatter Operations on Graphics Processors", Proceedings of the 2007 ACM/IEEE Conference on Supercomputing (SC '07), Article No. 46, Nov. 2007, 12 pages.
Scheuerman, "Advanced Depth of Field", GDC 2004, 2004, 21 pages.
International Search Report and Written Opinion of the International Searching Authority dated Jan. 12, 2021 in connection with International Patent Application No. PCT/KR2020/013538, 9 pages.

\* cited by examiner

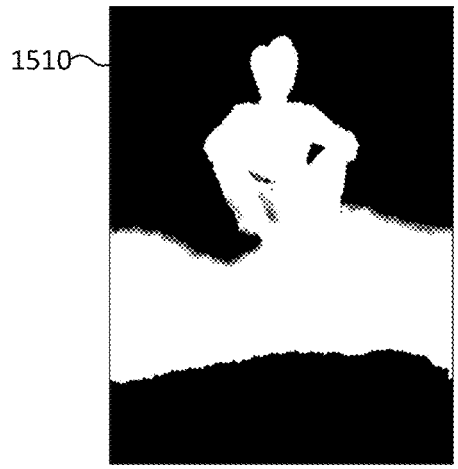
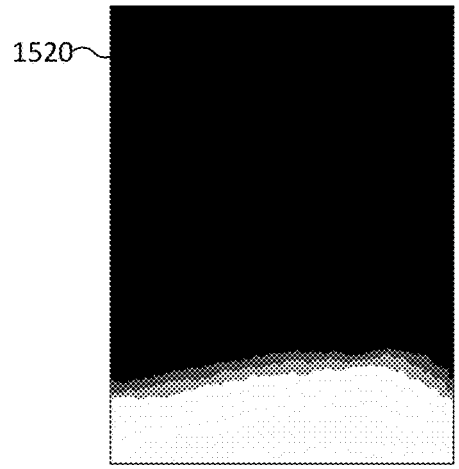
FIGURE 15A　　　　　FIGURE 15B
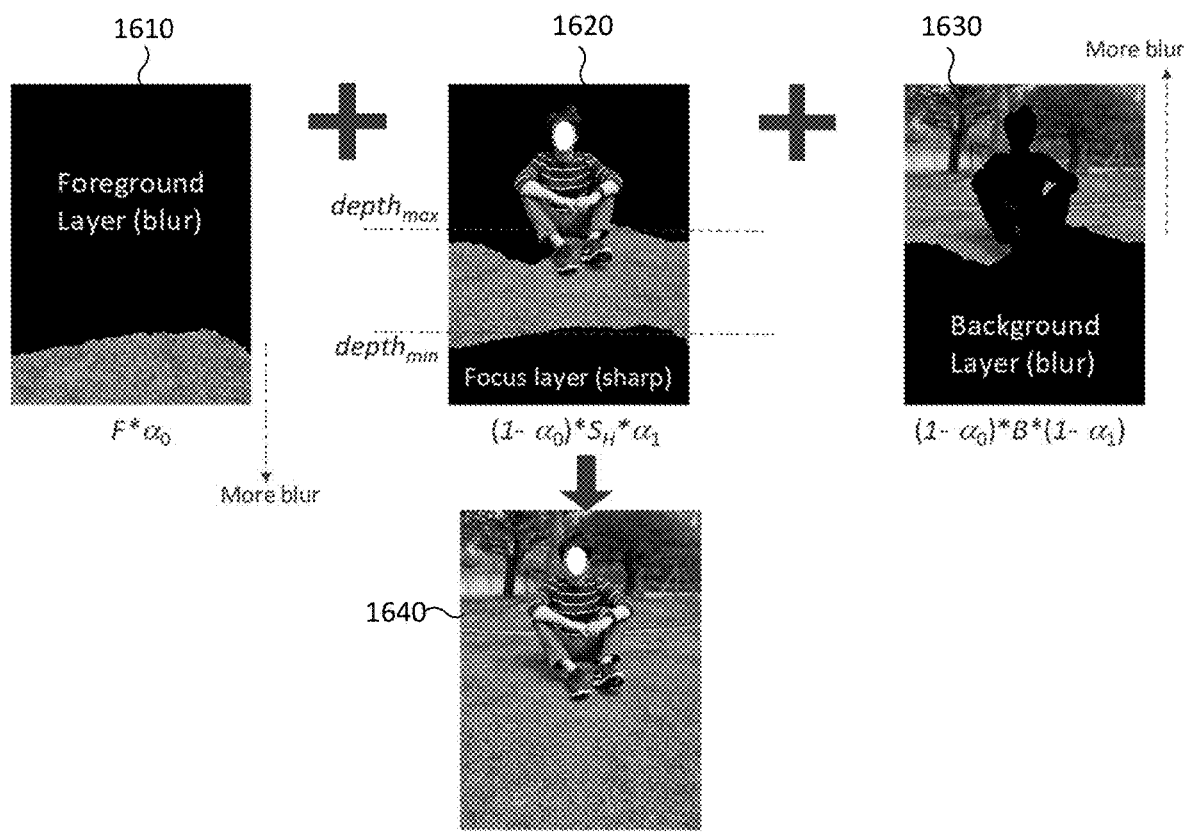
FIGURE 16

GENERATION OF BOKEH IMAGES USING ADAPTIVE FOCUS RANGE AND LAYERED SCATTERING

TECHNICAL FIELD

This disclosure relates generally to image capturing systems. More specifically, this disclosure relates to the generation of Bokeh images using an adaptive focus range and layered scattering.

BACKGROUND

Many mobile electronic devices, such as smartphones and tablet computers, include cameras that can be used to capture still and video images. While convenient, cameras on mobile electronic devices typically have short focal lengths and small aperture sizes, so pictures taken on a mobile electronic device are usually sharp. As a result, it is hard to create artistic effects such as "Bokeh" in captured images unless a subject in a scene is very close to the mobile electronic device.

"Bokeh" refers to an effect that helps to improve the aesthetic quality of an image by blurring out-of-focus portions of the image (such as a background of the image) while keeping other portions of the image (such as a foreground or one or more subjects) in focus. For many mobile electronic devices, Bokeh is achieved computationally rather than optically. For example, a mobile electronic device may estimate various depths in a scene, and Bokeh images of the scene can be created computationally using the estimated depths.

SUMMARY

This disclosure relates to the generation of Bokeh images using an adaptive focus range and layered scattering.

In a first embodiment, a method includes determining, using at least one processor, a depth of range of focus for a scene. The method also includes determining, using the at least one processor, multiple layers associated with the scene based on the depth of focus range, where each layer is associated with image data having a different range of disparity values. The method further includes blending, using the at least one processor, the layers to produce an image having a Bokeh effect in a foreground and a background, and focused image data within the depth of focus range. The multiple layers include at least a first layer associated with the foreground, a second layer associated with the depth of focus range, and a third layer associated with the background.

In a second embodiment, an electronic device includes multiple image sensors configured to capture image data for a scene and at least one processor operatively connected to the image sensors. The at least one processor is configured to determine a depth of focus range for the scene. The at least one processor is also configured to determine multiple layers associated with the scene based on the depth of focus range, where each layer is associated with image data having a different range of disparity values. The at least one processor is further configured to produce an image having a Bokeh effect in a foreground and a background, and focused image data within the depth of focus range. The multiple layers include at least a first layer associated with the foreground, a second layer associated with the depth of focus range, and a third layer associated with the background.

In a third embodiment, a non-transitory machine-readable medium contains instructions that when executed cause at least one processor of an electronic device to determine a depth of focus range for the scene. The medium also contains instructions that when executed cause the at least one processor to determine multiple layers associated with the scene based on the depth of focus range. Each layer is associated with image data having a different range of disparity values. The medium further contains instructions that when executed cause the at least one processor to produce an image having a Bokeh effect in a foreground and a background, and focused image data within the depth of focus range. The multiple layers include at least a first layer associated with the foreground, a second layer associated with the depth of focus range, and a third layer associated with the background.

In a fourth embodiment, a method includes determining, using at least one processor, a focus position in a scene based on an input touch point. The method also includes initializing, using the at least one processor, a depth of focus range related to the input touch point. The method further includes generating, using the at least one processor, an image preview based on the initial depth of focus range, where the image preview is focused within the initial depth of focus range and blurry outside the initial depth of focus range.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" in accordance with this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 15A and 15B illustrate example alpha blending maps in accordance with this disclosure;

FIG. 16 illustrates an example combination of image layers to create a final Bokeh image in accordance with this disclosure.

DETAILED DESCRIPTION

FIGS. 1 through 17B, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, cameras in many mobile electronic devices suffer from various shortcomings related to image capture, such as short focal lengths and small aperture sizes. As a result, it is hard to create artistic effects such as Bokeh in images captured using mobile electronic devices. While computational Bokeh seeks to recreate the Bokeh effect in images captured by mobile electronic devices, computational Bokeh does not always satisfy a user's intent regarding a range of focus in an image. In other words, the user cannot control which objects appear blurry and which objects appear sharp in an image using computational Bokeh.

Often times, to produce the Bokeh effect using mobile electronic devices, two or more cameras are used to estimate various depths in a scene, and a Bokeh image is computed using a sharp image of the scene and its depth map. The depth map controls how much blur is applied to each pixel of the sharp image according to the depth of the corresponding pixel. Ideally, pixels forming the background of a scene are blurred more, and pixels forming the foreground of the scene or one or more targets of focus in the scene are blurred less. However, there are various situations in which part of a target in a scene may be in focus while another part of a target is blurred, such as when the target spans multiple depths in the scene.

This disclosure provides techniques for adaptive Bokeh based on a range of focus as defined by a user. For example, these techniques allow a user to define maximum and minimum depths of focus for a scene, such as by providing a graphical user interface having two sliding bars. Based on the defined maximum and minimum depths of focus, these techniques process image data to help ensure that the image data between the maximum and minimum depths of focus remain sharp while the other image data can be blurred. This can help to produce more aesthetically-pleasing Bokeh images. Note that while this functionality is often described below as being used in a mobile electronic device, this functionality may be used with any other suitable type of electronic device.

Figure 1:
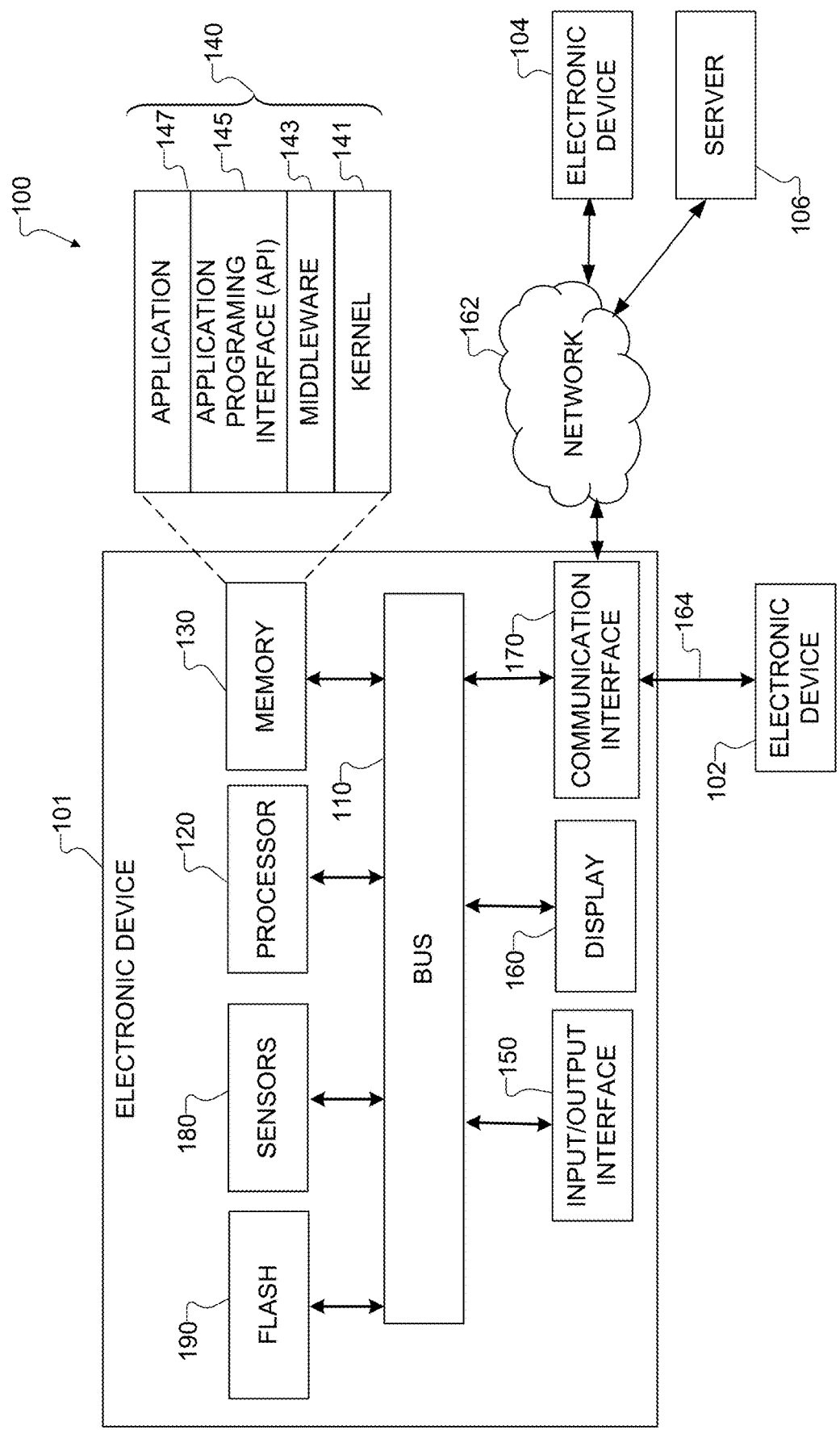
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

In accordance with this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). Among other things, the processor 120 can receive image data captured by at least one imaging sensor and process the image data as discussed in more detail below to produce images having improved Bokeh.

The memory 130 can include a volatile and/or non-volatile memory. For example, the memory 130 can store commands or data related to at least one other component of the electronic device 101. In accordance with this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application program 147). The kernel 141 provides an interface that allows the middleware 143, the API 145, or the application 147 to access the individual components of the electronic device 101 to control or manage the system resources. The application 147 includes one or more applications for image capture and image processing as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101. The one or more cameras can capture images as discussed below and may be used in conjunction with at least one flash 190. The flash 190 represents a device configured to generate illumination for use in image capture by the electronic device 101, such as one or more LEDs.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
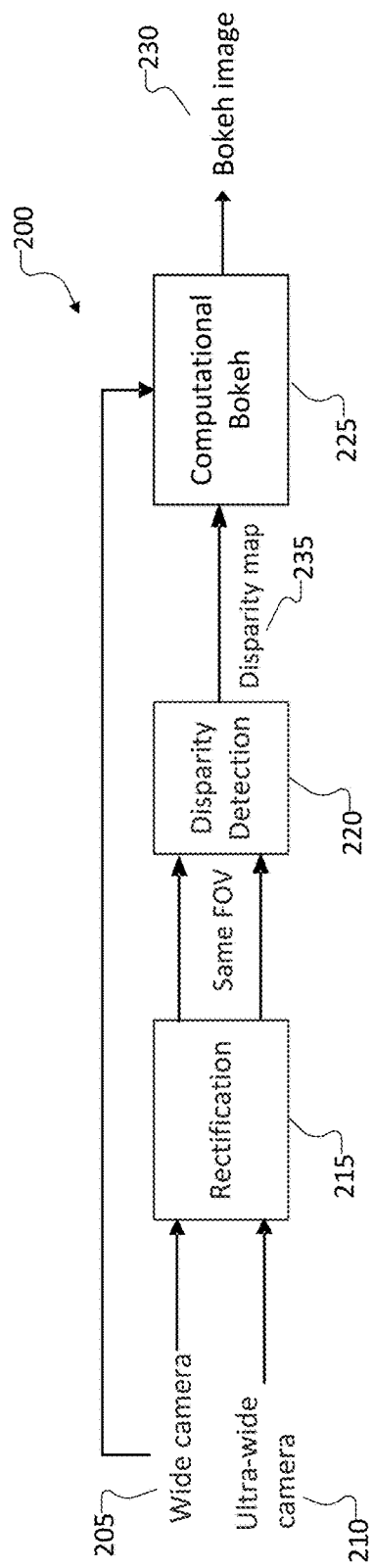
FIG. 2 illustrates an example process for creating a Bokeh image using an electronic device in accordance with this disclosure.

FIG. 2 illustrates an example process 200 for creating a Bokeh image using an electronic device in accordance with this disclosure. For ease of explanation, the process 200 shown in FIG. 2 is described as being performed using the electronic device 101 of FIG. 1. However, the process 200 shown in FIG. 2 could be used with any other suitable electronic device and in any suitable system.

As shown in FIG. 2, the electronic device 101 includes two cameras or other imaging sensors. In this example, the imaging sensors include a wide angle camera 205 and an ultra-wide angle camera 210. The cameras 205 and 210 can be used to capture high-resolution images, and (as the names imply) the images captured by the camera 210 can have a wider angle than the images captured by the camera 205. In some embodiments, the camera 205 can capture images having a resolution of 4,096 pixels by 3,072 pixels, and the camera 210 can capture images having a resolution of 4,608 pixels by 3,456 pixels. Note, however, that each camera 205 and 210 may have another other suitable resolution, which may or may not be different.

During operation, the cameras 205 and 210 can be used to capture images of the same scene at the same time while focused on the same object, but the cameras 205 and 210 capture the images from slightly different views. The images are processed using a rectification function 215, which operates to crop and align the images. This produces aligned images having the same field of view. The aligned images produced by the rectification function 215 may have any suitable resolution. In some embodiments, the rectification function 215 produces images having a resolution of 2,048 pixels by 1,536 pixels, although other resolutions may be used. The rectification function 215 may use any suitable technique to rectify or align images. For example, the rectification function 215 may use global Oriented FAST and Rotated BRIEF (ORB) features and local features from a block search to align the images.

A disparity detection function 220 processes the aligned images to produce a disparity map 235. The disparity map 235 identifies pixel differences between the aligned images on a pixel-by-pixel basis and can therefore have the same resolution as the aligned images. When multiple cameras 205 and 210 capture images at the same time, the pixel differences are (ideally) caused only by the different locations of the cameras 205 and 210 (which can be referred to as binocular disparity in some cases). In a disparity map 235, objects in the foreground of a scene have a larger disparity in images captured by the cameras 205 and 210, and objects in the background of the scene have a smaller disparity in images captured by the cameras 205 and 210. Thus, disparity is inversely proportional to depth, and the disparity map 235 can also function as a depth map for the scene being imaged. The disparity detection function 220 may use any suitable technique to identify disparity or depth in a scene using multiple images. In some embodiments, the disparity detection function 220 may be implemented using a machine learning algorithm, such as one or more neural network layers, that can be trained to recognize disparity or depth in images.

A computational Bokeh function 225 uses the disparity map 235 and at least one of the images from the cameras 205, 210 to generate a final Bokeh image 230, which represents a captured image of the scene having one or more blurred areas. The computational Bokeh function 225 can operate as described below in order to provide the Bokeh effect based on a range of depths of focus, which can be defined by a user. For example, the computational Bokeh function 225 can take the image captured by the camera 205, ensure that image data with the defined depth of focus range is sharp, and blur image data outside the defined depth of focus range. The Bokeh image 230 here can have the same resolution as the image captured by the camera 205, such as 4,096 pixels by 3,072 pixels (although other resolutions may be used).

Each function 215, 220, 225 shown in FIG. 2 can be implemented in any suitable manner. For example, in some embodiments, one or more functions 215, 220, 225 can be implemented or supported using one or more software applications or other software instructions that are executed by the processor 120 of the electronic device 101. In other embodiments, one or more functions 215, 220, 225 can be implemented or supported using dedicated hardware components. In general, the operations of an electronic device can be performed using any suitable hardware or any suitable combination of hardware and software/firmware instructions.

Although FIG. 2 illustrates one example of a process 200 for creating a Bokeh image using an electronic device, various changes may be made to FIG. 2. For example, the electronic device may perform any other desired functions as part of the process 200 or as part of a larger image processing algorithm. As particular example, the images from the cameras 205, 210 may undergo other suitable pre-processing operations, and the Bokeh image 225 may undergo any suitable post-processing operations.

Figure 3:
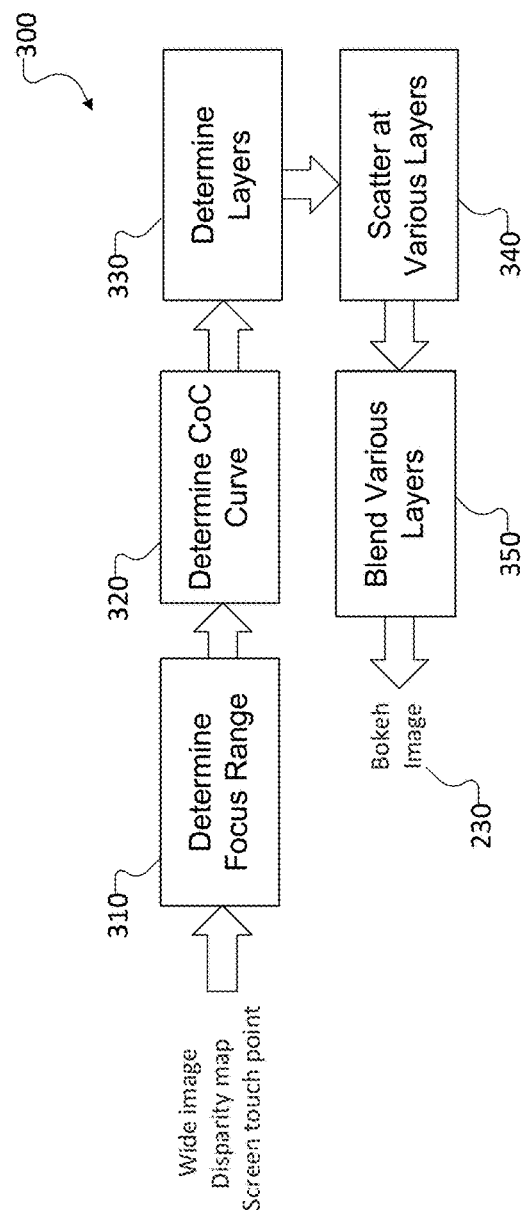
FIG. 3 illustrates an example process for applying computational Bokeh to an image in accordance with this disclosure.

FIG. 3 illustrates an example process 300 for applying computational Bokeh to an image in accordance with this disclosure. The process 300 shown in FIG. 3 may, for example, represent one possible implementation of the computational Bokeh function 225 used in the process 200 of FIG. 2. For ease of explanation, the process 300 shown in FIG. 3 is described as being performed using the electronic device 101 of FIG. 1. However, the process 300 shown in FIG. 3 could be used with any other suitable electronic device and in any suitable system.

As shown in FIG. 3, the process 300 receives various inputs, such as an image from the camera 205, a disparity map 235 from the disparity detection function 220, and one or more screen touch points (which are described below and can be used to define a depth of focus range). The process 300 performs various functions to produce a final Bokeh image 230. A focus range determination step 310 receives the various inputs here and allows a user to manipulate a depth of focus range through interactions with a touchscreen of the electronic device 101. Example operations of the focus range determination step 310 are described below with reference to FIGS. 4 and 5.

A circle of confusion (CoC) curve determination step 320 converts the depth of focus range provided by the focus range determination step 310 into a disparity focus range and generates a CoC curve. As described below, a CoC curve can be used to define the amount of blur to be applied to the image from the camera 205. Example operations of the CoC curve determination step 320 are described below with reference to FIGS. 6, 7, 8A through 8D, and 9A and 9B.

A layer determination step 330 uses the CoC curve to define multiple layers associated with the image from the camera 205, where each layer represents a range of disparity in a scene or image. This can be done by using the CoC curve and comparing the disparity in the image from the camera 205 to maximum and minimum disparities associated with the depth of focus range. Example operations of the layer determination step 330 are described below with reference to FIGS. 10 and 11.

A scatter at various layers step 340 processes the identified layers to produce the Bokeh effect in the image from the camera 205. For example, the scatter at various layers step 340 can apply kernels of different sizes to each layer in order to blur the image data in different ways. The scatter at various layers step 340 can also generate alpha blending maps to be used to combine the layers. Example operations of the scatter at various layers step 340 are described below with reference to FIGS. 10 and 12.

A blend various layers step 350 blends the various layers provided by the scatter at various layers step 340 based on the blending maps provided by the scatter at various layers step 340. For example, the blend various layers step 350 can blend the layers in order of decreasing distance from the camera 205, accumulating image data layer by layer to produce the final Bokeh image 230. Example operations of the blend various layers step 350 are described below with reference to FIGS. 13 and 14.

Each step 310, 320, 330, 340, 350 shown in FIG. 3 can be implemented in any suitable manner. For example, in some embodiments, one or more steps 310, 320, 330, 340, 350 can be implemented or supported using one or more software applications or other software instructions that are executed by the processor 120 of the electronic device 101. In other embodiments, one or more steps 310, 320, 330, 340, 350 can be implemented or supported using dedicated hardware components. In general, the operations of an electronic device can be performed using any suitable hardware or any suitable combination of hardware and software/firmware instructions.

Although FIG. 3 illustrates one example of a process 300 for applying computational Bokeh to an image, various changes may be made to FIG. 3. For example, the electronic device may perform any other desired functions as part of the process 300 or as part of a larger image processing algorithm.

Figure 4:
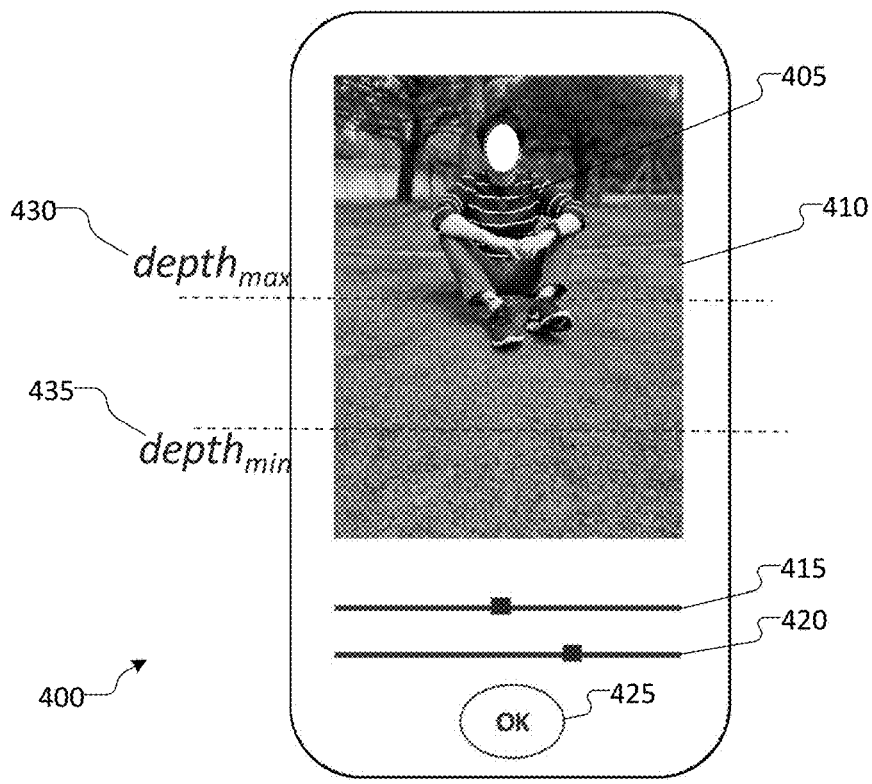
FIG. 4 illustrates an example user interface for receiving touch inputs that define a depth of focus range in accordance with this disclosure.

FIG. 4 illustrates an example user interface 400 for receiving touch inputs that define a depth of focus range in accordance with this disclosure. The user interface 400 may, for example, be used to obtain a depth of focus range from a user, and the depth of focus range can be provided as an input to the focus range determination step 310. For ease of explanation, the user interface 400 shown in FIG. 4 is illustrated as being provided by a specific type of electronic device 101 (namely a smartphone) in FIG. 1. However, the user interface 400 shown in FIG. 4 could be used with any other suitable electronic device and in any suitable system.

As shown in FIG. 4, the user interface 400 is displayed on a touchscreen of the electronic device 101 and includes a preview screen 410 and various controls 415, 420, 425. The preview screen 410 can display one or more preview images of a scene as captured by at least one camera 205, 210 of the electronic device 101. In some cases, a user can touch a specific point 405 on the preview screen 410 associated with an object or area the user would like to keep in focus. The preview screen 410 can also display the preview image with an estimated Bokeh effect based on the user's touchpoint, an object class, associated with the object in the image, and the controls 415, 420.

The controls 415, 420 allow a user to manipulate the depth of focus range in the preview image. For example, the control 415 can represent a slide bar or other input mechanism that allows the user to adjust the maximum depth of focus 430, such as by moving the bar left or right. Similarly, the control 420 can represent a slide bar or other input mechanism that allows the user to adjust the minimum depth of focus 435, such as by moving the bar left or right. As noted above and as described in more detail below, image data within the depth of focus range (as defined by the maximum depth of focus 430 and the minimum depth of focus 435) can be sharp in the Bokeh image 230, while image data outside the depth of focus range can be blurred to provide the Bokeh effect. In this way, the user can interactively define and control what areas of the image remain in focus and what areas become blurry. Other control buttons, such as an "OK" button 425, allow the user to accept the image as adjusted.

Although FIG. 4 illustrates one example of a user interface 400 for receiving touch inputs that define a depth of focus range, various changes can be made to FIG. 4. For example, the various controls can be implemented in any other suitable manner that allows a user to define a depth of focus range.

Figure 5:
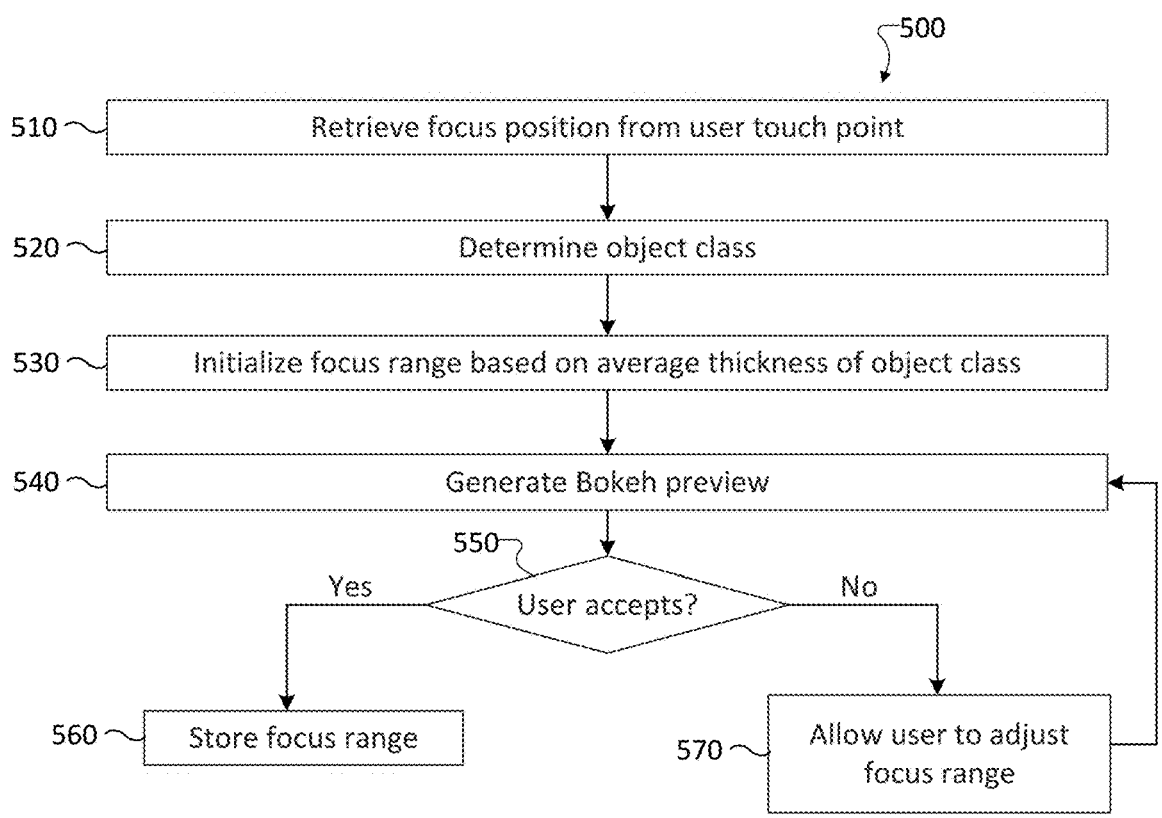
FIG. 5 illustrates an example method of determining an adaptive focus range in accordance with this disclosure.

FIG. 5 illustrates an example method 500 of determining an adaptive focus range in accordance with this disclosure. The method 500 may, for example, be performed as part of the focus range determination step 310 based on input received via the user interface 400. For ease of explanation, the method 500 shown in FIG. 5 is described as being performed by the electronic device 101 of FIG. 1. However, the method 500 shown in FIG. 5 could be performed by any other suitable electronic device with any other suitable user interface and in any suitable system.

As shown in FIG. 5, in step 510, the user interface 400 receives a touch point 405 on the preview screen 410 defining a focus position in a scene. This allows a focus position D within the scene to be identified, and the depth of focus at that focus position can be identified. The depth of focus at the focus position can be determined in any suitable manner, such as based on the disparity identified at the focus position.

In step 520, an object class is identified based on the object that lies at the focus position D. Different object classes define average depths for different objects, and the electronic device 101 may identify the object that lies at the focus position D (such as by using pattern recognition) and then identify the object class for that object. For example, the object that lies at the focus position D may represent a person, and a person object class may define the average thickness of a human to be about 0.55 meters (about 1.8 feet). Various object classes can be defined based on a number of different objects, such as people, cars, trees, animals, food, and other objects.

In step 530, an initial depth of focus range in a scene is determined based on the focus position D and the thickness associated with the identified object class. For example, the electronic device 101 may set the minimum depth of focus 435 to be the focus position D minus a front thickness value T1, and the electronic device 101 may set the maximum depth of focus 430 to be the focus position D plus a back thickness value T2. This can be expressed as:

$$depth_{min} = D - T1 \quad (1)$$

$$depth_{max} = D + T2 \quad (2)$$

Here, the values of T1 and T2 may be selected so that the average thickness of the object in the scene at the focus position D is included in the initial range of focus. Note that if the object in the scene at the focus position D has no associated object class, the values of T1 and T2 may be set to default values. Essentially, this allows the electronic device 101 to estimate, based on the focus position D and the average depth of the object, what the initial depth of focus range should be.

In step 540, a Bokeh preview is generated and presented via the user interface 400. For example, the electronic device 101 may generate an image of the scene, where the image includes the Bokeh effect as generated using the initial depth of focus range. In step 550, a determination is made whether the user accepts the preview or would like to further adjust the depth of focus range. If the user accepts the preview, the user can hit the OK button 425 in step 560, and the depth of focus range is stored for use in generating a final Bokeh image 230. If the user does not accept the preview, the user manipulates one or both controls 415, 420 to the user's preference in step 570, and the process returns to step 540 to update the Bokeh preview based on the modified settings.

The ability of a user to adaptively define a depth of focus range enables (among other things) an image to include the Bokeh effect in the background only or in both the background and the foreground of a scene (such as when the field of depth is large). In a conventional camera, when trying to capture an image of two people at different depths in a scene, the focus can be set on the front person, and the back person will be blurred. In order to capture both people in focus, the aperture would be reduced to increase the field of depth, resulting in the background not being very blurry and the foreground of the image remaining sharp. In accordance with this disclosure, the minimum and maximum depths of focus can be controlled independently, which allows the user to adjust both the background blur level and the foreground blur level. The resulting large depth of field is physically impossible for conventional DSLR cameras to produce.

Although FIG. 5 illustrates one example of a method 500 of determining an adaptive focus range, various changes can be made to FIG. 5. For example, while shown as a series of steps, various steps in FIG. 5 could overlap, occur in parallel, occur in a different order, or occur any number of times.

Figure 6:
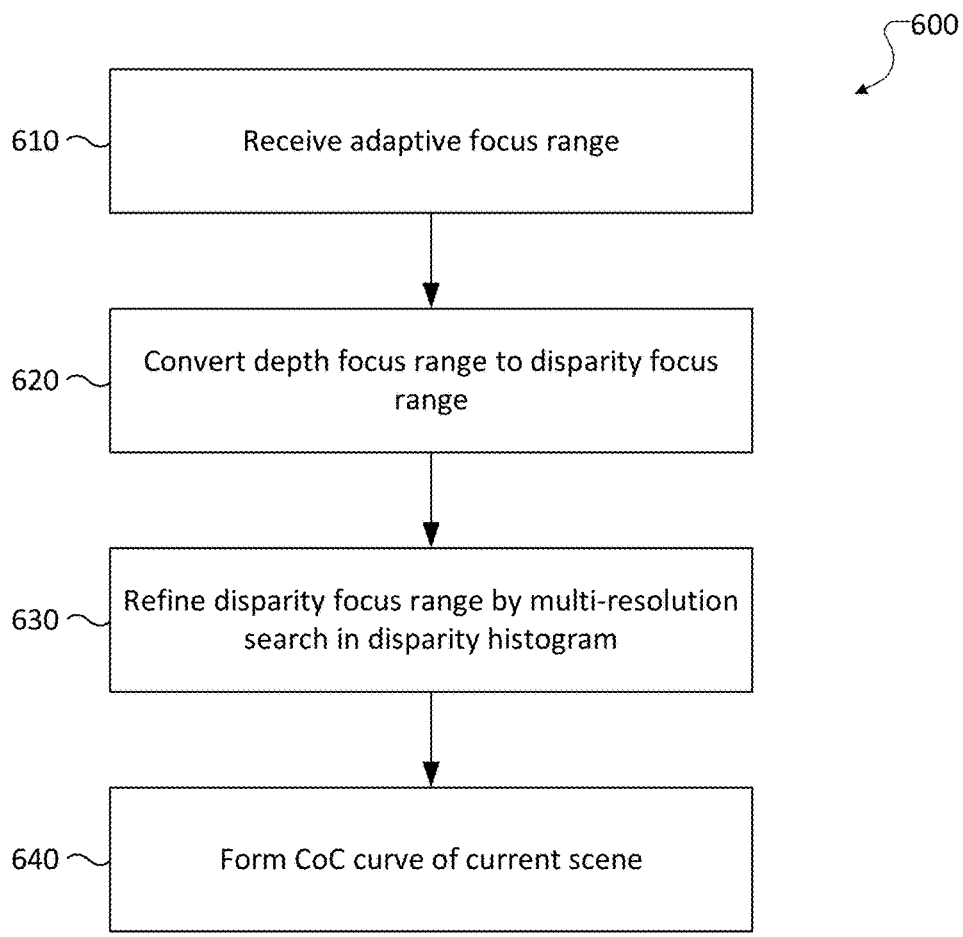
FIG. 6 illustrates an example method of determining a circle of confusion (CoC) curve in accordance with this disclosure.

FIG. 6 illustrates an example method 600 of determining a CoC curve in accordance with this disclosure. The method 600 may, for example, be performed as part of the CoC curve determination step 320. For ease of explanation, the method 600 shown in FIG. 6 is described as being performed by the electronic device 101 of FIG. 1. However, the method 600 shown in FIG. 6 could be performed by any other suitable electronic device with any other suitable user interface and in any suitable system.

As shown in FIG. 6, in step 610, the electronic device 101 receives an adaptive depth of focus range in a scene, which may be generated using the method 500 of FIG. 5. In step 620, the adaptive focus range is converted from a depth focus range to a disparity focus range. This can be done in any suitable manner since disparity is inversely proportional to depth. One example technique for converting a depth focus range to a disparity focus range is described below with respect to FIG. 7. As described below, the disparity focus range is associated with a maximum disparity $d_{max}$ (associated with the minimum depth of focus 435) and a minimum disparity $d_{min}$ (associated with the maximum depth of focus 430).

In step 630, the disparity focus range is refined through a multi-resolution search in a disparity histogram. That is, the exact values for the maximum disparity $d_{max}$ and the minimum disparity $d_{min}$ can be altered using the disparity histogram. One example of this is described below with respect to FIGS. 8A, 8B, 8C, and 8D.

In step 640, a CoC curve of a current scene is determined using the refined disparity focus range. The CoC curve here is used to satisfy the user's depth of focus range and create a virtual camera whose parameter settings are physically impossible to replicate using real-world optics. One example of this is described below with respect to FIGS. 9A and 9B.

Although FIG. 6 illustrates one example of a method 600 of determining a CoC curve, various changes can be made to FIG. 6. For example, while shown as a series of steps, various steps in FIG. 6 could overlap, occur in parallel, occur in a different order, or occur any number of times.

Figure 7:
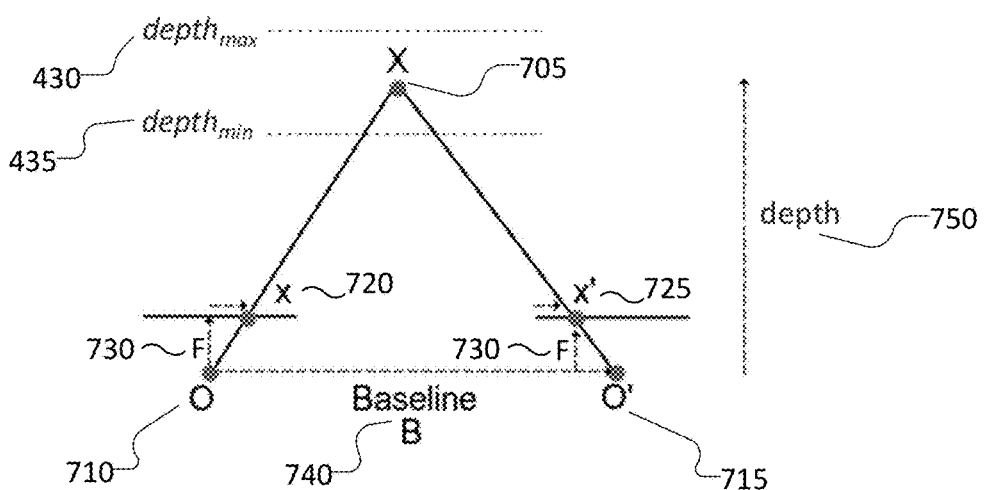
FIG. 7 illustrates an example conversion from depth space to disparity space in accordance with this disclosure.

FIG. 7 illustrates an example conversion from depth space to disparity space in accordance with this disclosure. This technique may, for example, be used as part of step 620 in the method 600 of FIG. 6. As noted above, in order to produce a Bokeh image based on an adaptive depth of focus range, the depth of focus range is converted from a depth space into a disparity space. Disparity is inversely proportional to depth, so maximum depth becomes minimum disparity and vice versa.

As shown in FIG. 7, a point 705 (labeled X) represents a point on a target object to be captured by a left camera 710 (labeled O) and a right camera 715 (labeled O'). These cameras 710, 715 may represent the two cameras 205, 210 described above. Because the cameras 710, 715 do not capture images from the exact same direction, a disparity exists in the location of the point 705 in images captured by the camera 710 and the location of the point 705 in images captured by the camera 715 (assuming both cameras 710, 715 are pointing directly upward here). Thus, the point 705 is offset from a visual axis of the camera 710 at a position 720 (labeled x) and is offset from a visual axis of the camera 715 at a position 725 (labeled x'). In this example, the focal lengths 730 (labeled F) of the cameras 710, 715 are assumed to be equal, and a baseline 740 (labeled B) represents the distance between the cameras 710, 715.

Based on this, a depth 750 from the cameras 710, 715 to the point 705 can be calculated using the baseline 740 and the distances of x and x' in FIG. 7. More specifically, the depth 750 can be calculated as BF/(x−x'). The expression (x−x') here represents the disparity in the image for the point 705, so the disparity associated with the point 705 can be expressed as BF/d, where d represents the depth 750.

As can be seen here, the maximum and minimum depths of focus 430, 435 are positioned behind and in front of the point 705. This helps to ensure that the object associated with the point 705 is in focus in a final Bokeh image 230. This also means that a range of disparity values can be determined based on the maximum and minimum depths of focus 430, 435. For example, the maximum disparity $d_{max}$ may be calculated as BF/depth$_{min}$, and a minimum disparity $d_{min}$ may be calculated as $d_{min}$=BF/depth$_{max}$. The maximum and minimum disparity values calculated in this manner may represent the initial disparity values calculated in step 620, and these disparity values can be refined during step 630 as described below.

Although FIG. 7 illustrates one example of a conversion from depth space to disparity space, various changes may be made to FIG. 7. For example, FIG. 7 is not necessarily drawn to scale and is merely meant to illustrate one example of how depth information can be converted into disparity information.

FIGS. 8A, 8B, 8C, and 8D illustrate an example multi-resolution disparity focus range refinement using a disparity histogram in accordance with this disclosure. As noted above, the initial maximum disparity $d_{max}$ and minimum disparity $d_{min}$ may be refined using a multi-resolution search in a disparity histogram. This may be necessary or desirable since the original maximum and minimum disparity values are estimated based on the depth to a single point (point 705 in FIG. 7) even though they are associated with different focus depths.

Figure 8A:
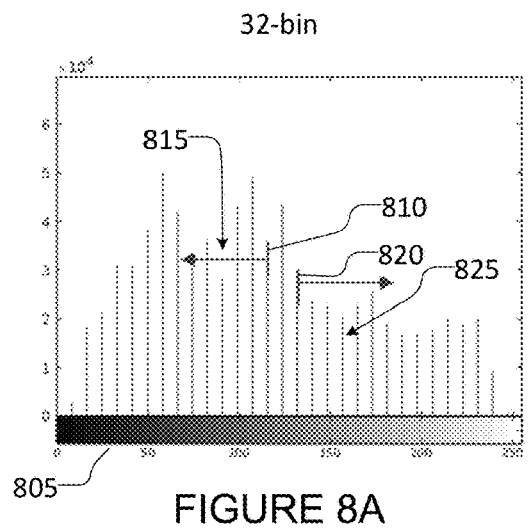
FIGS. 8A, 8B, 8C, and 8D illustrate an example multi-resolution disparity focus range refinement using a disparity histogram in accordance with this disclosure.

As shown in FIG. 8A, a disparity histogram 805 has been produced using the disparity values previously calculated by the electronic device 101. In the disparity histogram 805, the disparity values are placed in 32 bins, which (assuming the disparity values may range from 0-255) represent ⅛ of the original resolution of the disparity values. Starting at an initial position 810 on one side of the central bin, a search to the left of the histogram 805 is made to identify a local minimum or valley in the histogram 805, which in this example occurs in bin 815. The initial position 810 here represents the bin that includes the initial minimum disparity $d_{min}$. Similarly, starting at an initial position 820 on the other side of the central bin, a search to the right of the histogram 805 is made to identify a local minimum or valley in the histogram 805, which in this example occurs in bin 825. The initial position 820 here represents the bin that includes the initial maximum disparity $d_{max}$.

Figure 8B:
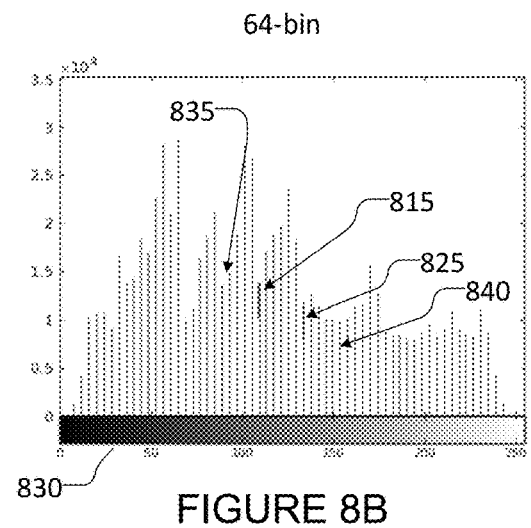

As shown in FIG. 8B, a disparity histogram 830 has been produced using the same disparity values previously calculated by the electronic device 101. In the disparity histogram 830, the disparity values are placed in 64 bins, which (assuming the disparity values may range from 0-255) represent ¼ of the original resolution of the disparity values. A search to the left of the histogram 830 is made starting at the bin 815 identified earlier to identify a local minimum or valley in the histogram 830 (bin 835), and a search to the right of the histogram 830 is made starting at the bin 825 identified earlier to identify a local minimum or valley in the histogram 830 (bin 840).

Figure 8C:
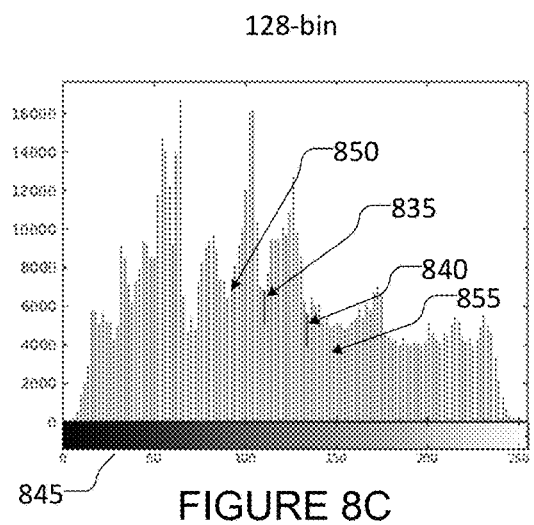

As shown in FIG. 8C, a disparity histogram 845 has been produced using the same disparity values previously calculated by the electronic device 101. In the disparity histogram 845, the disparity values are placed in 128 bins, which (assuming the disparity values may range from 0-255) represent ½ of the original resolution of the disparity values. A search to the left of the histogram 845 is made starting at the bin 835 identified earlier to identify a local minimum or valley in the histogram 845 (bin 850), and a search to the right of the histogram 845 is made starting at the bin 840 identified earlier to identify a local minimum or valley in the histogram 845 (bin 855).

Figure 8D:
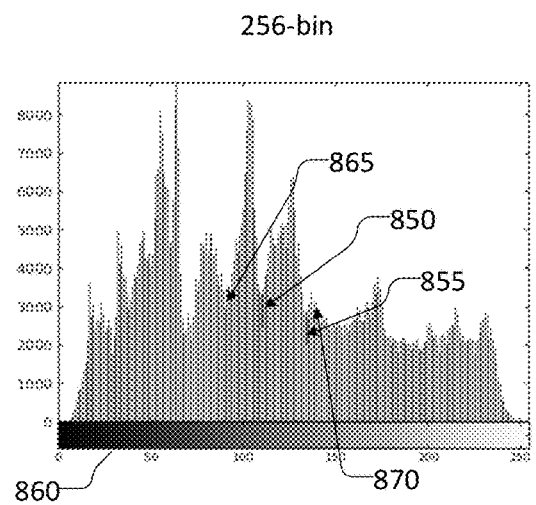

As shown in FIG. 8D, a disparity histogram 860 has been produced using the same disparity values previously calculated by the electronic device 101. In the disparity histogram 860, the disparity values are placed in 256 bins, which (assuming the disparity values may range from 0-255) represent the original resolution of the disparity values. A search to the left of the histogram 860 is made starting at the bin 850 identified earlier to identify a local minimum or valley in the histogram 860 (bin 865), and a search to the right of the histogram 860 is made starting at the bin 855 identified earlier to identify a local minimum or valley in the histogram 860 (bin 870). The two bins identified here (bins 865 and 870 in this example) represent the new values for the minimum disparity $d_{min}$ and the maximum disparity $d_{max}$.

Although FIGS. 8A, 8B, 8C, and 8D illustrate one example of a multi-resolution disparity focus range refinement using a disparity histogram, various changes may be made to these figures. For example, the specific histograms and the specific bins identified during the searches are for illustration only and can vary based on the image data being processed. Also, note that in each histogram it is assumed there is a valley identified during a left or right search, although that may not necessarily occur (in which case the current bin from which the left or right search started can be used as the starting position in the next histogram, if any).

Figure 9A:
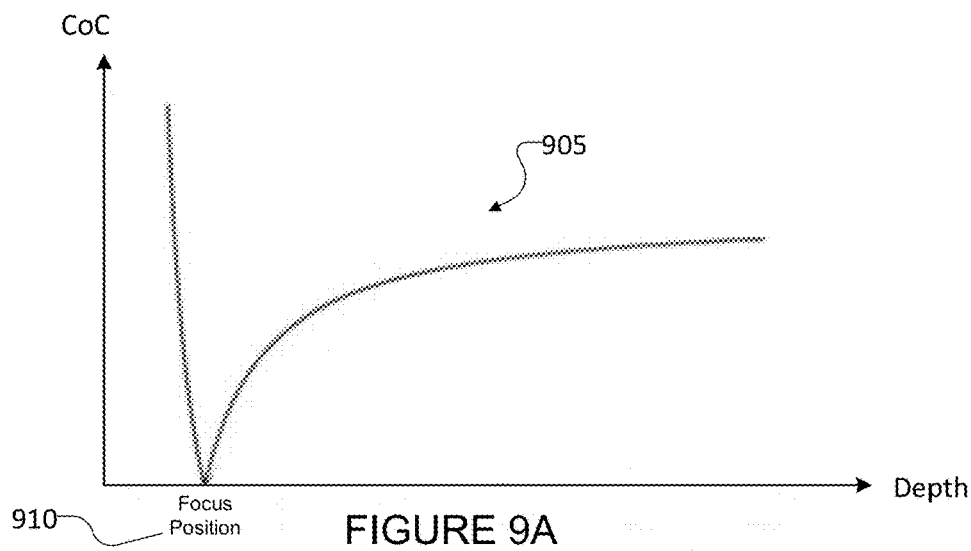
FIGS. 9A and 9B illustrate an example comparison of CoC curves defined over a depth or disparity range in accordance with this disclosure.
Figure 9B:
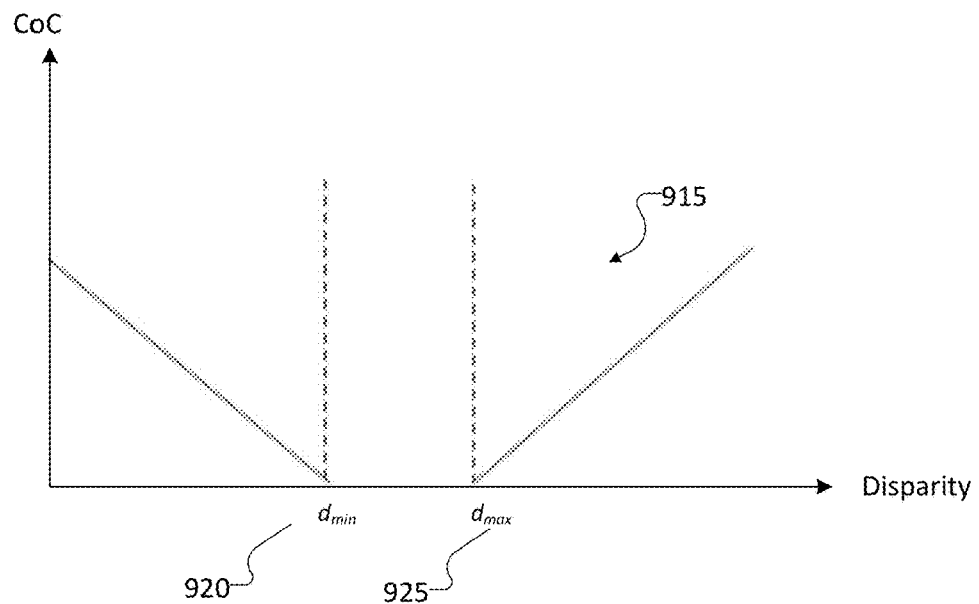

FIGS. 9A and 9B illustrate an example comparison of CoC curves defined over a depth or disparity range in accordance with this disclosure. In particular, FIG. 9A illustrates a CoC curve associated with a conventional camera, such as a DSLR camera, and FIG. 9B illustrates a CoC curve that may be generated according to the teachings of this disclosure.

A circle of confusion refers to the shape that light from a point forms on an imaging plane. When the light is in focus on the imaging plane, the light from the point also appears as a point on the imaging plane. When the light is out-of-focus on the imaging plane, the light from the point appears as a circle on the imaging plane (assuming the imaging plane is perpendicular to the light path), and the size of the circle depends on how out-of-focus the light is. As a result, a larger circle of confusion results in more blur, and a smaller circle of confusion results in less blur. This effect can be used in the imaging functionality described in this disclosure by defining different circles of confusion to different pixels in an image from the camera 205, thereby providing different amounts of blur to those pixels and achieving a desired Bokeh effect.

As shown in FIG. 9A, a CoC curve 905 for a standard DSLR camera is defined over depth. As can be seen here, the CoC curve 905 is non-linear, and there is a single focus position 910. As depth increases beyond the focus position 910, the CoC curve 905 rises quickly but begins to flatten out. As depth decreases in front of the focus position 910, the CoC curve 905 rises sharply (almost as a vertical line in this example). This indicates that in a typical DSLR camera, the focus range is not controllable and, as a result, the foreground increases in blurriness very quickly while the background increases in blurriness more gradually.

As shown in FIG. 9B, a CoC curve 915 can be defined over disparity by the CoC curve determination step 320. In this example, a refined minimum disparity 920 and a refined maximum disparity 925 can represent the values identified using the histogram-based approach described above. As can be seen here, the CoC curve 915 includes a piecewise linear curve having three linear segments, one decreasing towards the refined minimum disparity 920, one steady at zero between the refined disparities 920 and 925, and one increasing from the refined maximum disparity 925. The refined minimum disparity 920 and refined maximum disparity 925 here define a range of focus positions at which an image may remain in focus since the circle of confusion is zero, which is not something achievable using conventional optics. Based on this, it is possible for the electronic device 101 to apply different circles of confusion to different pixels in an image to blur those pixels, while other pixels in a desired depth of focus range can remain sharp. Also, the CoC curve 915 results in an image in which both the foreground and background can linearly increase in blurriness moving away from the range of focus.

In some embodiments, the CoC curve 915 used for a particular image can be determined as follows. When a CoC curve 915 is applied to an image, the CoC is applied based on a disparity map (instead of a depth map) in order to achieve an adaptive depth of focus range. Given that, when the CoC curve ≤1 (that is, the circle of confusion is less than one pixel), the corresponding pixel is sharp. Otherwise, when the CoC curve >1 (that is, the circle of confusion is larger than one pixel), the corresponding pixel is blurred by some amount as defined by the CoC curve. The CoC curve for a particular image can be calculated using the following equation:

$$CoC = \frac{fs}{\rho N}\left|\frac{1}{f} - \frac{\text{Disparity}}{BF} - \frac{1}{s}\right| \quad (3)$$

where CoC represents a diameter of the circle of confusion in pixels, f represents a focal length of the virtual camera, s represents a distance between the camera lens and an imaging plane, N represents the f-stop number of the aperture (meaning N=f/aperture diameter), r represents the pixel size, F represents the focal length of the wide camera 205, and B represents the baseline distance between the cameras 205, 210. In Equation (3), the values of s, r, F, and B are constants and are typically determined during factory calibration. Also, f and N are calculated here such that all pixels whose disparities are within the range defined by the refined disparity values 920, 925 are sharp, meaning CoC≤1 for those pixels. By doing so, this simulates the process photographers take when they manually adjust the focal length and aperture settings on a DSLR camera while maintaining the focus point.

In some embodiments, Equations (4) and (5) below are used to solve for f and N:

$$\frac{fs}{\rho N}\left(\frac{1}{f} - \frac{d_{min}}{BF} - \frac{1}{s}\right) = 1 \quad (4)$$

$$\frac{fs}{\rho N}\left(\frac{1}{f} - \frac{d_{max}}{BF} - \frac{1}{s}\right) = -1 \quad (5)$$

Once f and N are solved, the CoC curve can be calculated using Equation (3). By following this process, a virtual camera is created in which parameter settings are physically impossible to replicate with real-world optics, but the parameter settings do satisfy a user's depth of focus range to create an adaptive Bokeh effect. Note that in other embodiments, the CoC curve used for a specific image can be further processed, such as by sampling values defined by the CoC curve into an array and applying a low-pass filter. Graphically speaking, this may be equivalent to rounding the edges of the CoC curve 915 in FIG. 9B around the disparity values 920, 925.

Although FIGS. 9A and 9B illustrate one example of a comparison of CoC curves defined over a depth or disparity range, various changes may be made to FIGS. 9A and 9B. For example, the curves, focus positions, and ranges shown in FIGS. 9A and 9B are for illustration only and are merely meant to illustrate examples of specific CoC curves. The CoC curve applied to any specific image may vary from what is shown here. Also, it is not necessarily required that a CoC curve 915 be formed using linear segments.

Figure 10:
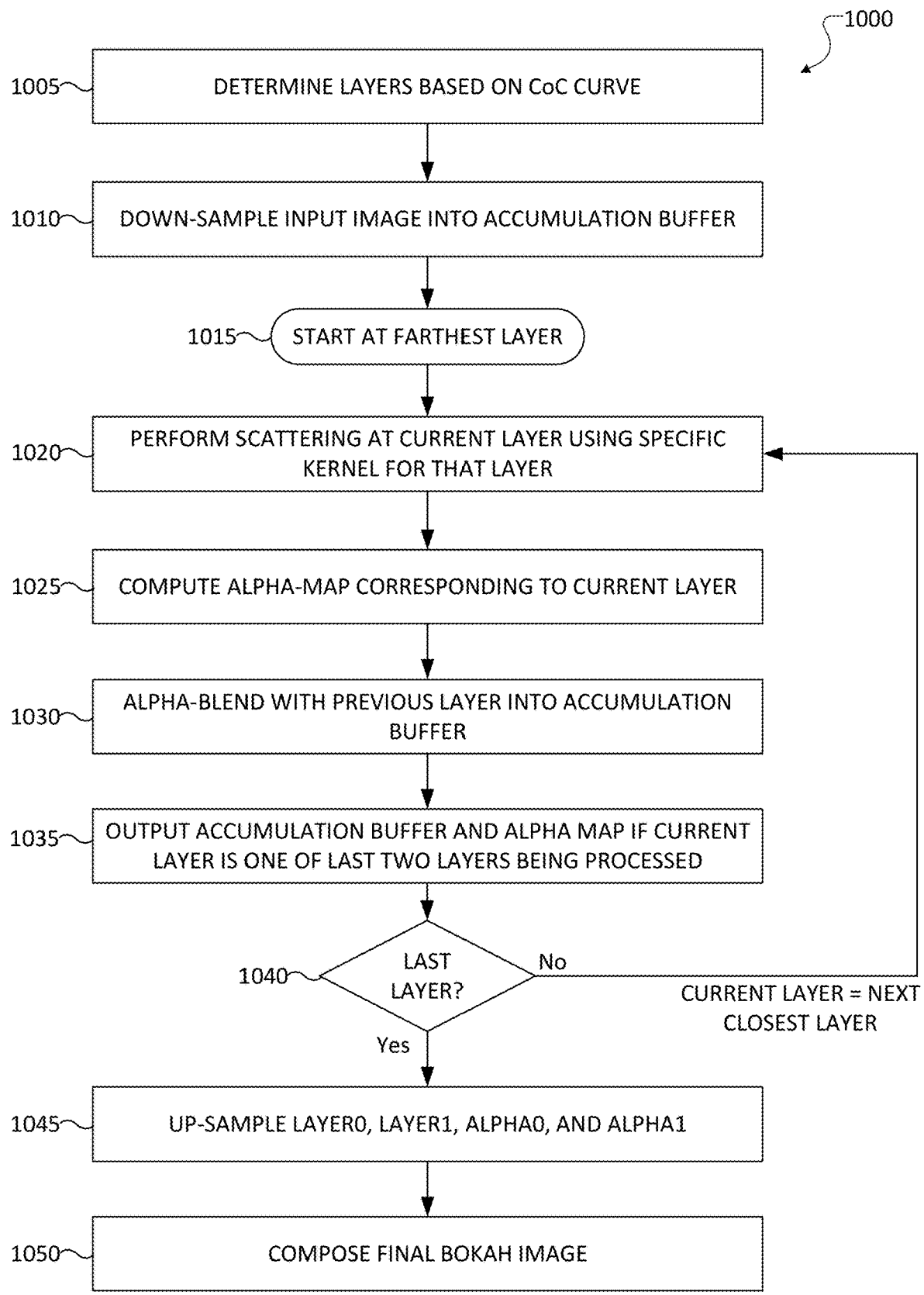
FIG. 10 illustrates an example method of layer determination and layered scattering in accordance with this disclosure.

FIG. 10 illustrates an example method 1000 of layer determination and layered scattering in accordance with this disclosure. The method 1000 may, for example, be performed as part of the layer determination step 330 and the scatter at various layers step 340. For ease of explanation, the method 1000 shown in FIG. 10 is described as being performed by the electronic device 101 of FIG. 1. However, the method 1000 shown in FIG. 10 could be performed by any other suitable electronic device with any other suitable user interface and in any suitable system.

As shown in FIG. 10, in step 1005, multiple layers associated with an image being processed are determined based on a CoC curve 915. For example, different layers may be associated with different segments of the CoC curve 915. One example technique for defining layers is provided below with reference to FIG. 11. In step 1010, a high resolution input image is down-sampled into an accumulation buffer. This may include down-sampling the image from the camera 205 to produce a lower-resolution image. Here, layered scattering may be performed at a lower resolution than the input image to provide computational savings, although that is not necessarily required. For example, assume the electronic device 101 captures a wide high-resolution image $S_H$. The electronic device 101 may down-sample the high-resolution image $S_H$ to a lower-resolution image $S_L$. An accumulation buffer (denoted A) can then be used to store the lower-resolution image $S_L$.

In step 1015, the farthest layer (denoted N) in terms of distance from the virtual camera is selected, and the farthest layer should correspond to the furthest background in a scene. The other layers may be numbered in decreasing numerical order as the distance from the virtual camera decreases. Thus, in this example, the layers are processed in order from farthest to nearest. Each layer here represents a different range of disparities and therefore different segments of the CoC curve 915.

In step 1020, scattering is performed at the current layer using a specific kernel for that layer. The kernel applied to each specific layer is based on the portion of the CoC curve 915 associated with that layer. An example of this is described below with reference to FIG. 12. The application of the kernel to the current layer may result in blurring of the image data associated with that layer (unless the kernel used for the current layer is associated with disparities between the refined disparity values 920, 925). In either case, the output of this step is an image layer I(p).

In step 1025, an alpha blending map a(p) is calculated for the current layer. In step 1030, the image layer I(p) is blended with a prior layer based on the alpha blending map a(p) into the accumulation buffer A. The prior layer here represents the current contents of the accumulation buffer A, and the results from the blending are stored into the accumulation buffer A (overwriting the prior contents). Alpha blending refers to a type of blending where a value a is defined for each pixel location, where the pixel value in one image is weighted by a, the pixel value in another image is weighted by (1−a), and the weighted pixel values are summed to compute a new pixel value in a new image. Note that for the first layer being processed, this step may be skipped, the contents of the first layer may be stored in the accumulation buffer A.

In step 1030, the current contents of the accumulation buffer and the current alpha blending map are output if the current layer is one of the last two layers being processed. This supports the processing of image data as discussed below. In step 1040, a determination is made whether the current layer represents the last layer to be processed. If not, the next-closest layer is selected, and the process returns to step 1020 to perform scatting using a different kernel. Essentially, as the process proceeds here, the accumulation buffer is updated during each iteration to store a blended version of all prior layers, moving farthest to closest.

If the current layer represents the last layer to be processed, two sets of image data (the contents of the accumulation buffer for both the last layer and the second-to-last layer) and two alpha blending maps have been generated and output. In step 1245, this data is upsampled. Here, Layer0 represents the image data from the accumulation buffer for the last layer processed, Alpha0 represents the alpha blending map for the last layer processed, Layer1 represents the image data from the accumulation buffer for the second-to-last layer processed, and Alpha1 represents the alpha blending map for the second-to-last layer processed. This data can be upsampled in order to support to generation of a high-resolution final Bokeh image 230, which is produced in step 1050. This is explained further below with reference to FIGS. 13 and 14.

Although FIG. 10 illustrates one example of a method 1000 of layer determination and layered scattering, various changes may be made to FIG. 10. For example, while shown as a series of steps, various steps in FIG. 10 could overlap, occur in parallel, occur in a different order, or occur any number of times.

Figure 11:
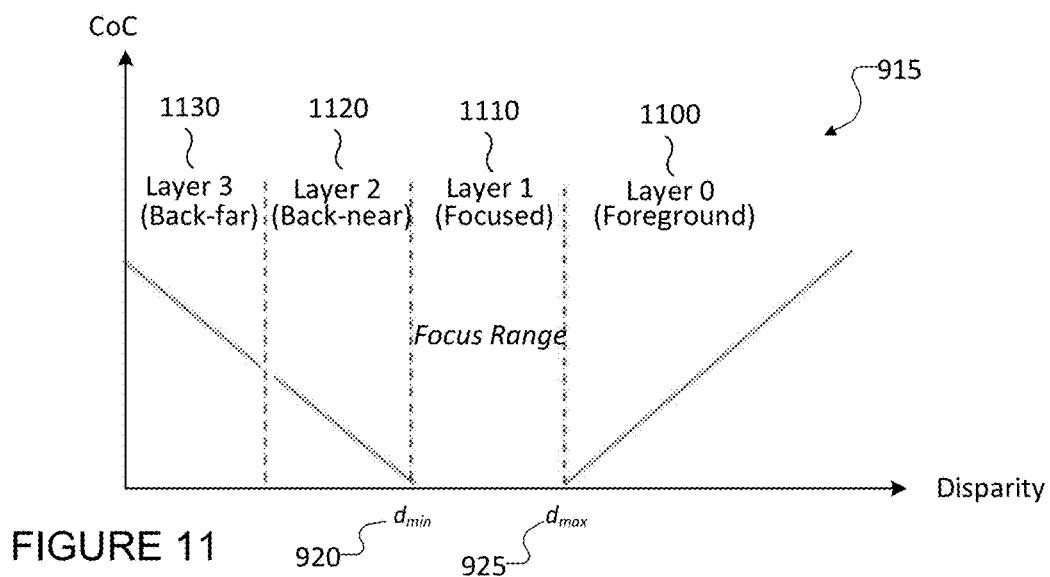
FIG. 11 illustrates an example definition of multiple layers based on a CoC curve defined over disparity in accordance with this disclosure.

FIG. 11 illustrates an example definition of multiple layers based on a CoC curve 915 defined over disparity in accordance with this disclosure. The multiple layers here may, for example, be identified by the layer determination step 330 and used by the scatter at various layers step 340.

As noted above, the CoC curve 915 is defined over disparity values, and different ranges of disparity values can be associated with different layers processed by the electronic device. The different layers allow varying degrees of blurriness to be applied to an image via layered scattering as described above. In this particular example, there are four layers 1100, 1110, 1120, and 1130 defined. In particular, layer 1100 represents the foreground of a scene and is associated with disparities greater than the refined disparity 925, and layer 1110 represents the desired depth of focus range of the scene and is associated with disparities between the refined disparities 920, 925. Also, disparities less than the refined disparity 920 are associated with two layers 1120 and 1130, which respectively represent the near background and the far background in the scene.

In the method 1000 described above, a final Bokeh image 230 of a scene can be produced by taking image data associated with the layer 1130 and alpha-blending that image data with the image data associated with the layer 1120. The resulting image data is stored in the accumulation buffer and is alpha-blended with the image data associated with the layer 1110. The resulting image data is stored in the accumulation buffer, and the resulting image data and associated alpha blending map are output as Layer1 and Alpha1 in the method 1000. The resulting image data is also alpha-blended with the image data associated with the layer 1100, and the resulting image data and the associated alpha blending map are output as Layer0 and Alpha0 in the method 1000. Thus, as described above, the layers are processed in order to distance from farthest to closest, with image data being blended as the layers are processed in that order.

Although FIG. 11 illustrates one example of a definition of multiple layers based on a CoC curve, various changes can be made to FIG. 11. For example, a CoC curve may be divided into less or more than four layers. For instance, the background may be divided into any number of layers, and the foreground may be divided into any number of layers.

Figure 12:
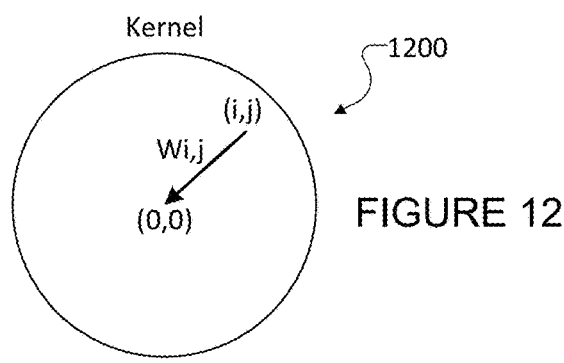
FIG. 12 illustrates an example kernel in accordance with this disclosure.

FIG. 12 illustrates an example kernel 1200 in accordance with this disclosure. The kernel 1200 here may, for example, be used by the scatter at various layers step 340 to apply blurriness to image data being processed. The kernel 1200 here applies weights to different pixels within a circle of confusion around a central pixel at position (0, 0), where the weights can vary based on the positions of the pixels around the central pixel. Essentially, this can be viewed as each pixel sending out its intensity to its neighboring pixels following the kernel coefficients (weights), so each pixel receives multiple intensities coming from multiple sources (adjacent pixels). The final intensity of a particular pixel is defined as the weighted average of all incoming intensities. The kernel 1200 here therefore represents the weight associated with a pixel at a neighboring position (i, j) as $W_{i,j}$, and the weights associated with all pixels within the circle of confusion may or may not be the same.

In some embodiments, the size of the kernel 1200 is proportional to the CoC value as defined by the CoC curve 915. Thus, larger values in the CoC curve 915 are associated with larger kernels 1200, and smaller values in the CoC curve 915 are associated with smaller kernels 1200. In particular embodiments, a uniform kernel 1200 (a kernel having uniform weights) may be applied to the farthest layer (layer 1130 in FIG. 11), and a rational kernel 1200 may be applied for all other layers. A rational kernel 1200 for a particular layer may include weights calculated using the following equations:

$$func(r, x) = \frac{(2x + r)(x - r)^2}{r^3} \tag{6}$$

$$w_{i,j} = \min\left(0.618, func\left(\frac{CoC}{\sqrt{2}}, |i| + |j|\right)\right) \tag{7}$$

where all coefficients are normalized to sum to a value of one. Given these definitions, the following formula may be used to produce the image data as a result of a particular scattering (as performed in step 1020 described above):

$$\text{destination pixel} = \frac{\sum \text{source } pixel_{(i,j)} * \text{kernel } weight_{(i,j)}}{\sum \text{kernel } weight_{(i,j)}} \quad (8)$$

To produce a final Bokeh image 230, the various layers are blended together in a back-to-front fashion as noted above and as explained in more detail below with reference to FIGS. 13 and 14. Also as described below, the alpha blending maps are created during the layer scattering operation to produce a final Bokeh image 230 that reduces or eliminates artifacts such as the halo effect. In some embodiments, each alpha blending map is produced for a specific layer using the following equation:

$$\text{alpha at destination pixel} = \Sigma \text{kernel } weight_{(i,j)}. \quad (9)$$

Although FIG. 12 illustrates one example of a kernel 1200, various changes may be made to FIG. 12. For example, as noted above, the size of the kernel 1200 can vary based on the associated disparity as defined by the CoC curve 915.

Figure 13:
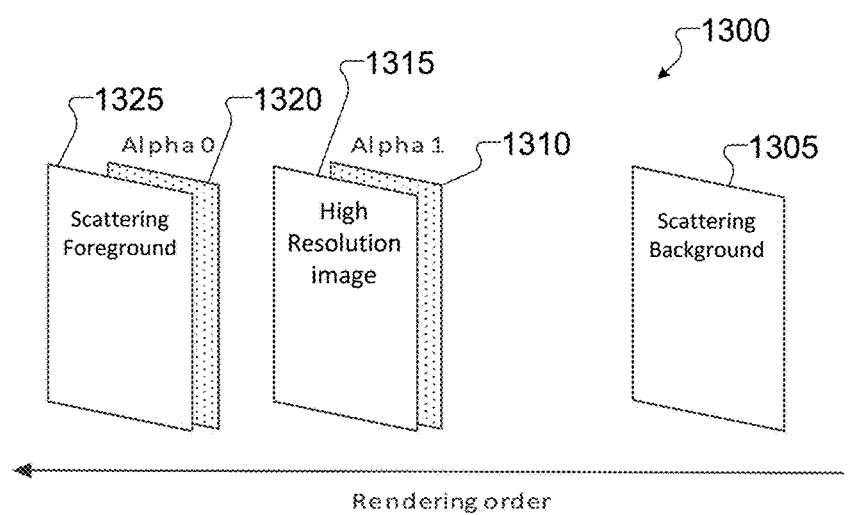
FIGS. 13 and 14 illustrate an example process for final composition of a Bokeh image in accordance with this disclosure.
Figure 14:
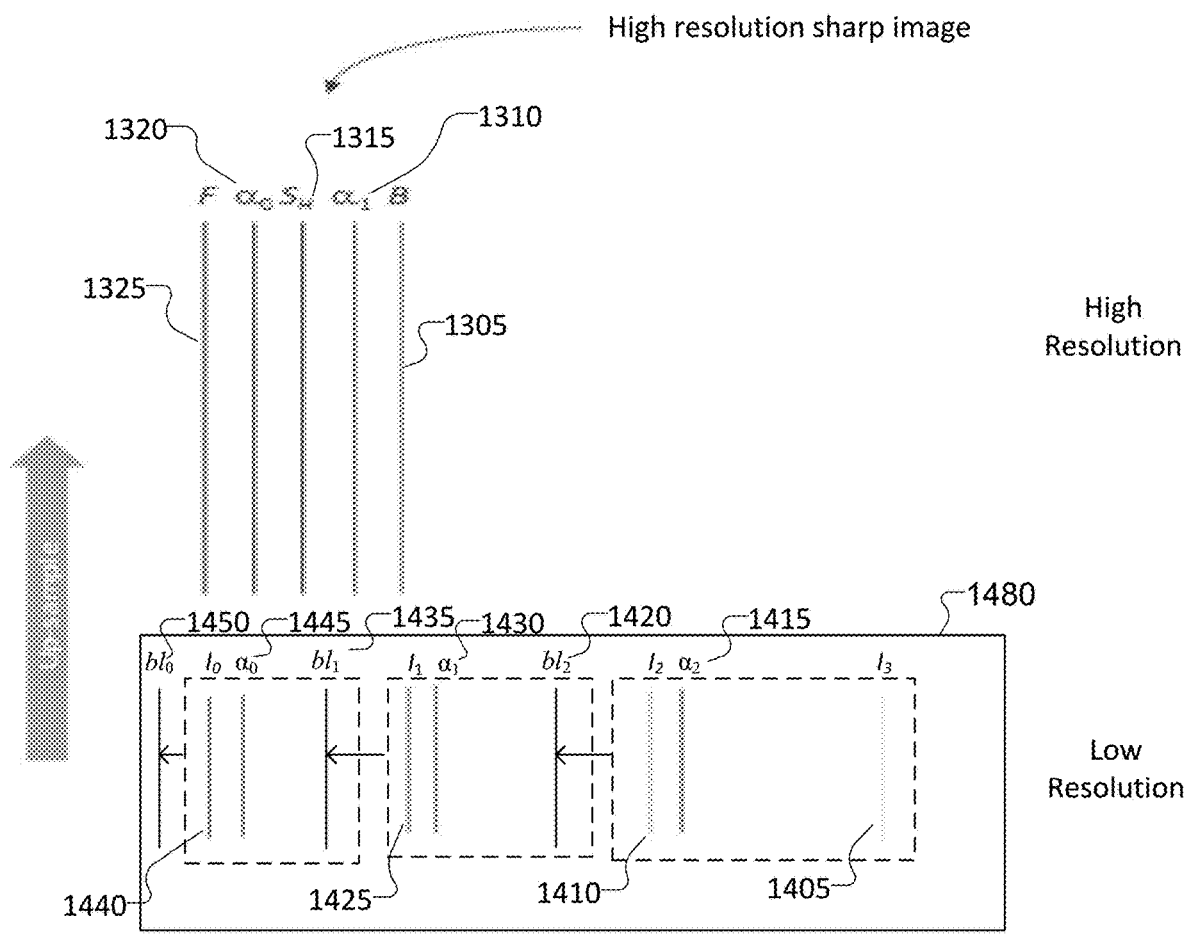

FIGS. 13 and 14 illustrate an example process 1300 for final composition of a Bokeh image in accordance with this disclosure. The process 1300 may, for example, be performed as part of the blend various layers step 350. For ease of explanation, the process 1300 shown in FIG. 13 is described as being performed by the electronic device 101 of FIG. 1. However, the process 1300 shown in FIG. 13 could be performed by any other suitable electronic device with any other suitable user interface and in any suitable system.

As shown in FIG. 13, the layered blending of image data here starts with a scattering background 1305, which represents the farthest layer (such as layer 1130) or a bended version of the farthest layers (such as layers 1120 and 1130). Thus, the scattering background 1305 may represent the accumulation of all previous layers of image data. An alpha map 1310 (Alpha1) associated with an image layer 1315 (Layer1) is generated and used to blend the scattering background 1305 with the image layer 1315 to produce blended image data. An alpha map 1320 (Alpha0) associated with a scattering foreground 1325 (Layer0) is generated and used to blend the blended image data from the prior layers with the image data in the scattering foreground 1325.

Note that the image layer 1315 here can represent a high-resolution image, such as the image from the camera 205. This allows the scattering background 1305 to be used to produce the Bokeh effect in the background of the image from the camera 205 and the scattering foreground 1325 to be used to produce the Bokeh effect in the foreground of the image from the camera 205. In this way, the scattering concept is applied in an ordered, layered fashion from back-to-front so that the foreground layer overwrites the background layer when necessary. In addition, by alpha-blending the layers, halo artifacts present in many computational Bokeh images is reduced or eliminated.

FIG. 14 illustrates how the processing described above can be used to produce image data that can then be processed as shown in FIG. 13 to produce a final Bokeh image 230. In this example, image data is processed after down-sampling as described above, and the image data is processed in order of decreasing distance in a scene. Here, image data 1405 (representing the farthest layer) is blended with image data 1410 (representing the next farthest layer) based on an alpha blending map 1415 to produce image data 1420. The image data 1420 is blended with image data 1425 based on an alpha blending map 1430 to produce image data 1435. The image data 1435 is blended with image data 1440 based on an alpha blending map 1445 to produce image data 1450. Various results produced here are then upsampled into the high-resolution domain. This produces the various layers 1305, 1315, 1325 and blending maps 1310, 1320, which can be used as described above to produce the final Bokeh image 230.

In other embodiments, single-resolution scattering can be performed. That is, all layers can be rendered at the highest resolution, instead of performing steps to down-sample the layers, perform scattering, and up-sample the output layers. In still other embodiments, pyramid scattering can be performed. That is, instead of down-sampling the high resolution image $S_H$ uniformly across all layers, each layer can be scaled down individually. For instance, the far-background layer may be down-sampled to a ⅟₁₆ resolution of the input image, and the other layers may be down-sampled to a ¼ resolution of the input image. Note that other scattering operations may occur here without departing from the scope of this disclosure.

Although FIGS. 13 and 14 illustrate one example of a process for final composition of a Bokeh image, various changes may be made to FIGS. 13 and 14. For example, while certain numbers of layers may be used here, other numbers of layers may also be used.

FIGS. 15A and 15B illustrate example alpha blending maps in accordance with this disclosure. For example, FIG. 15A illustrates an alpha blending map 1510 that may correspond to map 1320 in FIGS. 13 and 14, and FIG. 15B illustrates an alpha blending map 1520 that may correspond to map 1310 in FIGS. 13 and 14. In these examples, white values may indicate that pixels from one image are to be weighted to the maximum extent, and black values may indicate that pixels from one image are to be weighted to the minimum extent (although the opposite could also be true). Grayscale values may indicate fractional combinations of pixels.

In the process described above, the alpha blending map 1510 causes the image data from the high-resolution image $S_H$ to remain for the target of the image (a person in this example), which keeps the final image sharp in those areas. However, the background data produced using the farther layers remains, allowing the blurriness introduced in earlier blending operations to remain. Similarly, the alpha blending map 1520 allows foreground image data to be blurred and to overwrite prior image data produced in the earlier blending operations, but it does not overwrite the image data from the high-resolution image $S_H$ for the target or the background.

Although FIGS. 15A and 15B illustrate examples of alpha blending maps, various changes may be made to FIGS. 15A and 15B. For example, the alpha blending maps shown here are examples only and are based on specific image data being captured. Other alpha blending maps would be generated for other image data.

FIG. 16 illustrates an example combination of image layers to create a final Bokeh image in accordance with this disclosure. As shown in FIG. 16, a foreground layer 1610 represents a combination of foreground image data produced by the scattering performed on the nearest layer(s) as described above and the alpha blending map 1520. A focus layer 1620 represents a combination of the high-resolution image $S_H$ and the alpha blending map 1510. A background layer 1630 represents a combination of the background image data produced by the scattering performed on the farthest layer(s) as described above and the areas not identified in white in the alpha blending maps 1510, 1520. These layers 1610, 1620, 1630 can be combined to produce a final Bokeh image 1640.

Although FIG. 16 illustrates one example of a combination of image layers to create a final Bokeh image, various changes can be made to FIG. 16. For example, while three layers of image data are shown here, other numbers of image data layers may also be used.

Figure 17A:
FIGS. 17A and 17B illustrate an example comparison of images in accordance with this disclosure.
Figure 17B:

FIGS. 17A and 17B illustrate an example comparison of images in accordance with this disclosure. In particular, FIG. 17A illustrates a Bokeh image 1710 generated using a DSLR camera, and FIG. 17B illustrates a Bokeh image 1720 generated using the approaches described in this patent document.

As can be seen in FIG. 17A, a person is reaching his arm backwards, which causes his hand to be farther away depth-wise from a camera capturing the image 1710. As a result, while the person's face is generally in focus, the person's hand is not. This is because the optics of a DSLR camera cannot provide a depth of focus range. As can be seen in FIG. 17B, the image 1720 can be generated after a user defines a depth of focus range that includes the person's face and hand. Using the techniques described above, both the person's face and the person's hand are in focus in the image 1720, while the background remains blurry and provides the Bokeh effect.

Although FIGS. 17A and 17B illustrate one example of a comparison of images, various changes may be made to FIGS. 17A and 17B. For example, these images are merely meant to illustrate the type of effect that may be achieved using the techniques described above. Of course, other scenes and other implementations of the techniques described above may produce different results than those shown here.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   determining, using at least one processor, a depth of focus range for a scene;
   determining, using the at least one processor, multiple layers associated with the scene based on the depth of focus range, each layer associated with image data having a different range of disparity values, wherein determining the multiple layers comprises (i) converting maximum and minimum depths of focus into maximum and minimum disparities, (ii) generating a circle of confusion (CoC) curve based on the maximum and minimum disparities, and (iii) identifying the multiple layers based on different portions of the CoC curve; and
   blending, using the at least one processor, the multiple layers to produce an image having (i) a Bokeh effect in a foreground and a background and (ii) focused image data within the depth of focus range,
   wherein the multiple layers include at least a first layer associated with the foreground, a second layer associated with the depth of focus range, and a third layer associated with the background.

2. The method of claim 1, wherein determining the depth of focus range comprises:
   receiving user input defining the maximum depth of focus; and
   receiving user input defining the minimum depth of focus.

3. The method of claim 1, wherein:
   the first layer is associated with a portion of the CoC curve above the maximum disparity;
   the second layer is associated with a portion of the CoC curve between the maximum and minimum disparities; and
   the third layer is associated with a portion of the CoC curve below the minimum disparity.

4. The method of claim 1, wherein blending the layers comprises:
   blending the third layer with the second layer using a first blending map to produce blended image data; and
   blending the blended image data with the first layer using a second blending map.

5. A method comprising:
   determining, using at least one processor, a depth of focus range for a scene;
   determining, using the at least one processor, multiple layers associated with the scene based on the depth of focus range, each layer associated with image data having a different range of disparity values;
   performing, using the at least one processor, one or more scattering operations on the image data using a kernel, wherein the kernel includes weights based on a circle of confusion (CoC) curve; and
   blending, using the at least one processor, the multiple layers to produce an image having (i) a Bokeh effect in a foreground and a background and (ii) focused image data within the depth of focus range;
   wherein the multiple layers include at least a first layer associated with the foreground, a second layer associated with the depth of focus range, and a third layer associated with the background.

6. The method of claim 5, wherein identifying the multiple layers comprises:
   converting maximum and minimum depths of focus into maximum and minimum disparities;
   generating a circle of confusion (CoC) curve based on the maximum and minimum disparities; and
   identifying the multiple layers based on different portions of the CoC curve.

7. The method of claim 5, wherein:
   the CoC curve includes multiple segments; and
   the weights of the kernel vary based on the segment associated with the image data.

8. An electronic device comprising:
   multiple image sensors configured to capture image data for a scene; and
   at least one processor operatively connected to the image sensors and configured to:
      determine a depth of focus range for the scene;
      determine multiple layers associated with the scene based on the depth of focus range, each layer associated with image data having a different range of disparity values, wherein, to determine the multiple layers, the at least one processor is configured to (i) convert maximum and minimum depths of focus into maximum and minimum disparities, (ii) generate a circle of confusion (CoC) curve based on the maximum and minimum disparities, and (iii) identify the multiple layers based on different portions of the CoC curve; and blend the layers to produce an image having (i) a Bokeh effect in a foreground and a background and (ii) focused image data within the depth of focus range,
wherein the multiple layers include at least a first layer associated with the foreground, a second layer associated with the depth of focus range, and a third layer associated with the background.

9. The electronic device of claim 8, wherein, to determine the depth of focus range, the at least one processor is configured to:
receive user input defining the maximum depth of focus; and
receive user input defining the minimum depth of focus.

10. The electronic device of claim 8, wherein:
the first layer is associated with a portion of the CoC curve above the maximum disparity;
the second layer is associated with a portion of the CoC curve between the maximum and minimum disparities; and
the third layer is associated with a portion of the CoC curve below the minimum disparity.

11. The electronic device of claim 8, wherein, to blend the layers, the at least one processor is configured to:
blend the third layer with the second layer using a first blending map to produce blended image data; and
blend the blended image data with the first layer using a second blending map.

12. An electronic device comprising:
multiple image sensors configured to capture image data for a scene; and
at least one processor operatively connected to the image sensors and configured to:
determine a depth of focus range for the scene;
determine multiple layers associated with the scene based on the depth of focus range, each layer associated with image data having a different range of disparity values;
perform one or more scattering operations on the image data using a kernel, wherein the kernel includes weights based on a circle of confusion (CoC) curve; and
blend the multiple layers to produce an image having (i) a Bokeh effect in a foreground and a background and (ii) focused image data within the depth of focus range;
wherein the multiple layers include at least a first layer associated with the foreground, a second layer associated with the depth of focus range, and a third layer associated with the background.

13. The electronic device of claim 12, wherein, to identify the multiple layers, the at least one processor is configured to:
convert maximum and minimum depths of focus into maximum and minimum disparities;
generate a circle of confusion (CoC) curve based on the maximum and minimum disparities; and
identify the multiple layers based on different portions of the CoC curve.

14. The electronic device of claim 12, wherein:
the CoC curve includes multiple segments; and
the weights of the kernel vary based on the segment associated with the image data.

15. A non-transitory machine-readable medium containing instructions that when executed cause at least one processor of an electronic device to:
determine a depth of focus range for a scene;
determine multiple layers associated with the scene based on the depth of focus range, each layer associated with image data having a different range of disparity values, wherein the instructions that when executed cause the at least one processor to determine the multiple layers comprise instructions that when executed cause the at least one processor to (i) convert maximum and minimum depths of focus into maximum and minimum disparities, (ii) generate a circle of confusion (CoC) curve based on the maximum and minimum disparities, and (iii) identify the multiple layers based on different portions of the CoC curve; and
blend the layers to produce an image having (i) a Bokeh effect in a foreground and a background and (ii) focused image data within the depth of focus range,
wherein the multiple layers include at least a first layer associated with the foreground, a second layer associated with the depth of focus range, and a third layer associated with the background.

16. The non-transitory machine-readable medium of claim 15, wherein the instructions that when executed cause the at least one processor to determine the depth of focus range comprise:
instructions that when executed cause the at least one processor to:
receive user input defining the maximum depth of focus; and
receive user input defining the minimum depth of focus.

17. The non-transitory machine-readable medium of claim 15, wherein:
the first layer is associated with a portion of the CoC curve above the maximum disparity;
the second layer is associated with a portion of the CoC curve between the maximum and minimum disparities; and
the third layer is associated with a portion of the CoC curve below the minimum disparity.

18. The non-transitory machine-readable medium of claim 15, wherein the instructions that when executed cause the at least one processor to blend the layers comprise:
instructions that when executed cause the at least one processor to:
blend the third layer with the second layer using a first blending map to produce blended image data; and
blend the blended image data with the first layer using a second blending map.

19. A non-transitory machine-readable medium containing instructions that when executed cause at least one processor to:
determine a depth of focus range for a scene;
determine multiple layers associated with the scene based on the depth of focus range, each layer associated with image data having a different range of disparity values;
perform one or more scattering operations on the image data using a kernel, wherein the kernel includes weights based on a circle of confusion (CoC) curve; and
blend the multiple layers to produce an image having (i) a Bokeh effect in a foreground and a background and (ii) focused image data within the depth of focus range;
wherein the multiple layers include at least a first layer associated with the foreground, a second layer associated with the depth of focus range, and a third layer associated with the background.

20. The non-transitory machine-readable medium of claim 19, wherein the instructions that when executed cause the at least one processor to identify the multiple layers comprise:
instructions that when executed cause the at least one processor to:
convert maximum and minimum depths of focus into maximum and minimum disparities;
generate a circle of confusion (CoC) curve based on the maximum and minimum disparities; and
identify the multiple layers based on different portions of the CoC curve.

21. A method comprising:
determining, using at least one processor, a focus position in a scene based on an input touch point;
determining, using the at least one processor, an object class based on the input touch point;
initializing, using the at least one processor, a depth of focus range related to the input touch point, wherein initializing the depth of focus range is based on a predetermined thickness of the object class; and
generating, using the at least one processor, an image preview based on the initial depth of focus range, the image preview being focused within the initial depth of focus range and blurry outside the initial depth of focus range.

22. The method of claim 21, further comprising:
receiving user input related to the image preview, the user input accepting the initial depth of focus range; and
using the initial depth of focus range to generate a Bokeh image.

23. The method of claim 21, further comprising:
receiving user input related to the image preview, the user input altering at least one of a maximum depth of focus or a minimum depth of focus to define a revised depth of focus range; and
generating, using the at least one processor, an updated image preview based on the revised depth of focus range.

24. The method of claim 21, wherein different object classes are associated with different predetermined thicknesses, the different object classes including people, vehicles, trees, animals, and food object classes.

* * * * *